(12) United States Patent
Kikinis et al.

(10) Patent No.: US 7,372,956 B1
(45) Date of Patent: May 13, 2008

(54) METHOD AND APPARATUS FOR PROVIDING AN INTERACTIVE HOME AGENT WITH ACCESS TO CALL CENTER FUNCTIONALITY AND RESOURCES

(75) Inventors: Dan Kikinis, Saratoga, CA (US); Oleg Bondarenko, San Francisco, CA (US); Valery Issayev, San Bruno, CA (US); Yuri Shtivelman, Belmont, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 733 days.

(21) Appl. No.: 09/387,616

(22) Filed: Aug. 31, 1999

Related U.S. Application Data

(63) Continuation-in-part of application No. 08/840,125, filed on Apr. 3, 1997, now Pat. No. 5,940,495.

(51) Int. Cl.
*H04M 3/00* (2006.01)
*H04M 5/00* (2006.01)

(52) U.S. Cl. ............................. 379/265.01; 379/265.02
(58) Field of Classification Search ........... 379/265.09, 379/220.01, 265.11, 93.21, 265.02, 265.01; 370/353; 709/202
See application file for complete search history.

(56) References Cited

U.S. PATENT DOCUMENTS

| | | | | |
|---|---|---|---|---|
| 5,825,870 A | * | 10/1998 | Miloslavsky | 379/265.11 |
| 5,946,387 A | * | 8/1999 | Miloslavsky | 379/265.09 |
| 6,046,762 A | * | 4/2000 | Sonesh et al. | 348/14.11 |
| 6,094,673 A | * | 7/2000 | Dilip et al. | 709/202 |
| 6,122,364 A | * | 9/2000 | Petrunka et al. | 379/265.02 |
| 6,215,783 B1 | * | 4/2001 | Neyman | 370/353 |
| 6,324,276 B1 | * | 11/2001 | Uppaluru et al. | 379/220.01 |

* cited by examiner

Primary Examiner—Thjuan K. Addy
(74) Attorney, Agent, or Firm—Central Coast Patent Agency, Inc.

(57) ABSTRACT

A call center system supports remote agent stations through a network by establishing a data link between a computer platform at the remote agent station and a CTI-processor connected to a telephony switch at the call center, and switching incoming calls from the call center to a telephone at the remote agent station while sending data pertaining to the calls via the data link to the computer platform at the remote agent station to be displayed. Data pertaining to calls is retrieved from a data base at the call center and sent via the data link to be displayed on a video display at the remote agent station. The data can include scripts for an agent at the remote station. Call center services are supported by cooperation between software at the CTI processor and the computer platform at the remote station. In one embodiment the data link, once established, is kept open while calls continue to be switched to the remote station. In another, after an initial log in, dial up is done from the remote station upon detecting calls from the call center by a TAPI compliant device, and a reduced log in is performed at the CTI processor to save time. In a third alternative, the CTI processor, via a modem bank adapted for dialing, establishes the data connection each time a call is switched from the call center to the remote station. A plurality of remote stations may be thus supported.

7 Claims, 1 Drawing Sheet

Figure 1:
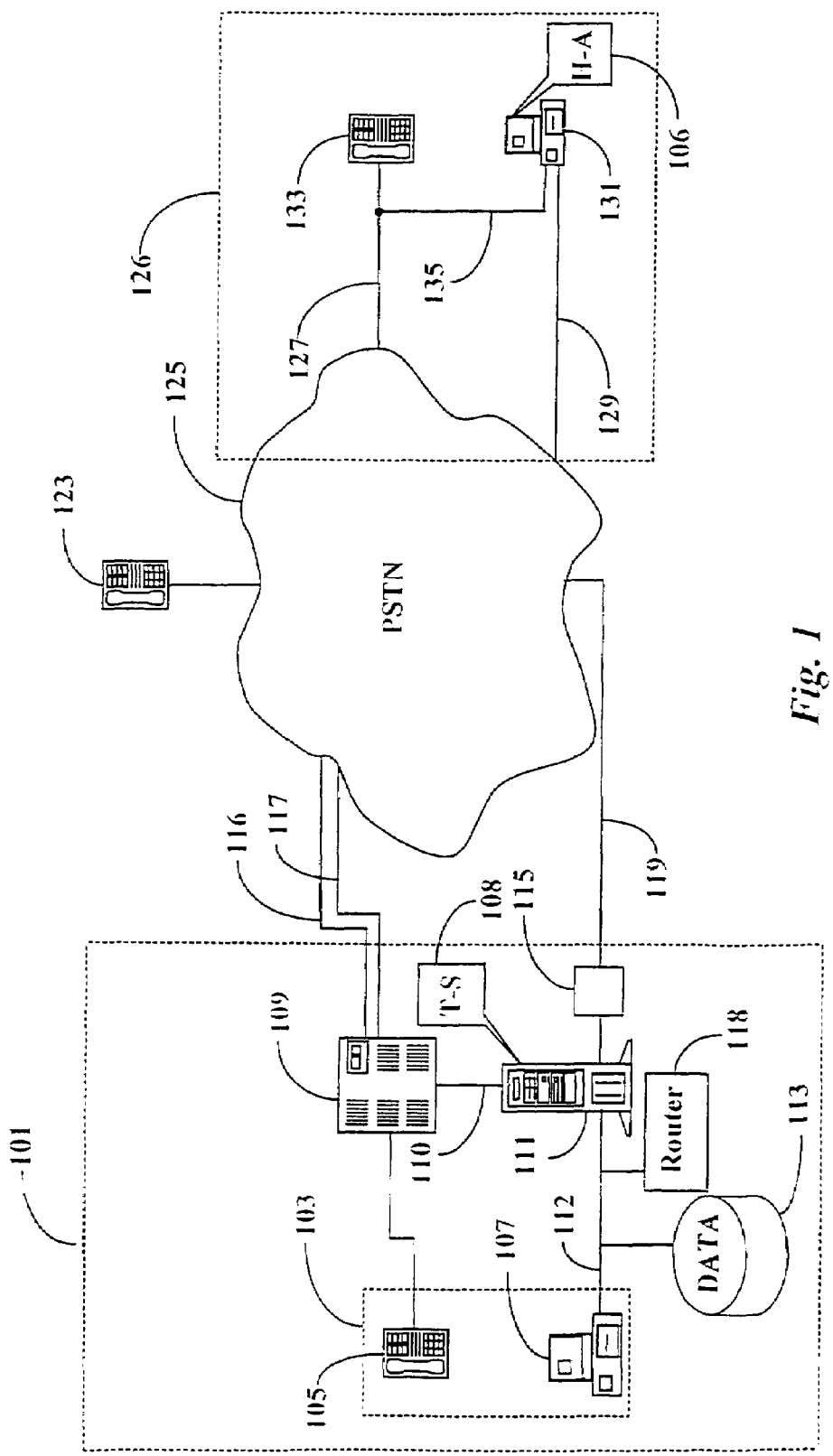

METHOD AND APPARATUS FOR PROVIDING AN INTERACTIVE HOME AGENT WITH ACCESS TO CALL CENTER FUNCTIONALITY AND RESOURCES

CROSS-REFERENCE TO RELATED DOCUMENTS

The present invention is a continuation-in-part of patent application Ser. No. 08/840,125, filed Apr. 3, 1997 now U.S. Pat. No. 5,940,495, which prior application is incorporated herein in its entirety by reference.

FIELD OF THE INVENTION

The present invention pertains to telephony communications systems and has particular application to methods including software enabling a home agent operating away from an associated call center to operate with full call center functionality and resources.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so would obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. In some cases organizations develop and maintain their own telephony operations with purchased or leased equipment, and in many other cases, companies are outsourcing such operations to firms that specialize in such services.

In a call center, a relatively large number of agents handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or a Central Office switch equipped with Centrex ACD service.

An organization having one or more call centers for serving customers typically provides one or more telephone numbers to the public or to their customer base, or both, that may be used to reach the call center service. The number or numbers may be published on product packaging, in advertisements, in user manuals, in computerized help files, and in any other convenient way. In most cases, when the numbers provided are toll-free numbers, a Service Control Point (SCP) directs the routing of the to one or another of associated call centers.

Routing of calls may be on several levels. Initial routing may be done at SCPs and further routing may be accomplished at individual call centers. Intermediate routers may also be used. As described above, a call center typically involves a central switch, which may have, for example, an Automatic Call Distributor (ACD) and may be a Private Branch Exchange (PBX), or a Centrex service. The central switch is typically connected to the public-switched telephone network (PSTN). Agents, trained to handle customer service, operate telephones connected to the central switch.

If the call center consists of just a switch and connected telephone stations, the routing that can be done is very limited. Switches, such as PBXs and PABXs and the like, although increasingly computerized, are limited in the range of computer processes that may be performed. For this reason additional computer capability in the art has been added for such switches by connecting computers adapted to monitor switch activity and to control switch functions. The processes of incorporating computer enhancement to telephone switches is known in the art as Computer Telephony Integration (CTI). The connected computers execute CTI applications provided to enhance switch and call center functions.

In a call center, agent stations having telephones connected to the switch may be equipped also with computers including video displays, such as PCs, so agents operating such stations may have access to stored data as well as being linked to incoming callers by a telephone connection. Such stations may be interconnected in a local area network (LAN) by any one of several known network protocols, and there may be other servers connected to the LAN as well, such a file servers and the like. In CTI enhanced systems the LAN may also connect to the CTI processor.

When a call arrives at a call center, whether or not the call has been pre-processed at a SCP, typically at least the telephone number of the caller is made available to the receiving switch at the call center by a telephone carrier. This service is available by most PSTNs as Automatic Number Identification (ANI) information in one of several formats. If the call center is computer-enhanced (CTI) the phone number of the calling party may be used to access additional information from a database at a server on the network that connects the agent workstations. In this manner information pertinent to a call may be provided to an agent.

Even with present levels of CTI there are still problems in operating such call centers, or a system of such call centers. There are waiting queues with which to contend, for example, and long waits may be experienced by some callers, while other agents may be available who could handle callers stuck in queues. Other difficulties accrue, for example, when there are hardware or software degradations or failures or overloads in one or more parts of a system. Still other problems are due to known latency in conventional equipment. There are many other problems, and it is well recognized in the art, and by the general public who have accessed such call centers, that there is much room for improvement in the entire concept and operation of such call center systems. It is to these problems, pertaining to efficient, effective, timely, and cost-effective service to customers (patrons) of call center systems that aspects and embodiments of the present invention detailed below are directed.

Corporations are faced with a challenge to provide consistent levels of customer service in an environment where call volumes are constantly changing. For example, a public response to a TV advertising campaign might require staffing levels far above average. Corporations are in constant need to flexibly change the number of agents based on variable volumes of calls.

One possible solution considered by providers of call center services is a home agent solution, wherein agents may be remotely based from the call center. This concept involves setting up home-based agents with the necessary equipment and lines so as to allow the agent to operate remotely but still retain access to call center functions such as call routing functions, customer information system (CIS) resources, conferencing options, and the like, that are provided to agents operating at the call center.

A problem with this remote agent, or home agent, concept prior to the time of the present invention is that all known implementations of home agent systems require dedicated hardware such as leased lines for both voice and data, special add-on cards enabling communication protocols to be converted, and special proprietary telephones made to operate remotely over such dedicated lines and circuits. Therefore, the expense of enabling multiple agents to function remotely can be very significant, and even much higher than the normal operating costs of expanding or upgrading the call center to accommodate more agents.

What is clearly needed is a method and apparatus whereby a company can station agents in remote locations other than at the call center, such as in their own homes, and still provide full call center functionality and CIS accessibility, without the requirement for added dedicated and proprietary equipment and special leased lines. A solution such as this would reduce company costs and increase call center efficiency and flexibility.

SUMMARY OF THE INVENTION

In a preferred embodiment of the present invention a home agent call center system is provided, including methods of practicing the invention with the call center system, comprising a telephony switch connected to a first trunk adapted for receiving incoming calls from a telephony network, and to a second trunk adapted for placing outbound calls into the network; a computer telephony integration (CTI) processor connected to the telephony switch and to a data base, the CTI processor executing a CTI application; an agent station remote from the call center, the agent station having a telephone connected by a first telephony line to the telephony network and a computer platform with a video display unit (PC/VDU) connected by a second telephony line through a modem to the telephony network; and a data port associated with the CTI processor adapted to establish a data connection. The data connection is established between the CTI processor and the computer station at the remote agent station, and as incoming calls are switched to the remote agent station, data pertaining to each incoming call is retrieved from the data base and sent via the open data link to the computer platform at the remote agent station to be displayed on the VDU.

In some embodiments the data connection is established prior to a first call being switched to the remote agent station, and is maintained open thereafter as further calls are switched to the remote agent station. In other embodiments the computer platform at the remote agent station is characterized by a TAPI-compliant device connected to the telephone such that the computer platform may detect incoming telephone calls, and, upon detecting a call from the call center, the computer platform immediately dials up the CTI-processor and establishes the data link by a reduced log-in procedure allowing a minimum-time connection. In yet another embodiment the CTI-processor is characterized by having a modem bank adapted to dial outgoing calls, and, as a call is selected to be switched to the remote agent station, the modem bank dials the remote agent station and establishes the data connection. The telephony network is a publicly-switched telephony network or any private or other wide-area network.

In some embodiments the data link is established over the telephony network, and in others over the Internet, wherein the CTI-processor is adapted as an Internet-connected server, and the data link is established by the computer platform at the agent station dialing up an Internet service provider (ISP) and establishing an Internet link to the CTI-processor.

All call center services available to locally-connected agents are made available also to remote agents by compatible software executing on the CTI-processor and on the computer platform at the remote agent stations. Plural stations will typically be supported from a single CTI-enhanced call center. Advantages of the invention are realized through processes of maintaining the data connection continuously between the remote station and the call center, or, if the connection is to be broken between calls, establishing procedures described in full detail below, for establishing and using the data connection very quickly as it is needed with each new call switched to a remote agent station. The invention in its several embodiments provides remote agent capability without necessity for leased lines, dedicated hardware, and proprietary telephones and the like. Through the teachings of the invention remote agent stations may established at any location where a telephone and a computer station is available, with two lines so voice calls and data may both be supported. The two lines may be two POTS lines or the two channels of an ISDN connection.

BRIEF DESCRIPTION OF THE DRAWING FIGURES

FIG. 1 is an overview of a call center and connected home agent according to an embodiment of the present invention.

DESCRIPTION OF THE PREFERRED EMBODIMENTS

FIG. 1 is an overview of a call center and connected home agent system according to an embodiment of the present invention. In this embodiment a functioning call center 101 and at least one remote workstation 126 are each connected to a Public Switched Telephone Network (PSTN) 125. For purposes of convenient description station 126 may be considered to be in an agent's home, but this is not required. A client telephone 123 is shown connected to PSTN 125 as well, and represents many telephones available to persons who may use the services of the call center and an agent at either workstation 126 or at the call center.

Call center 101 in this embodiment comprises a telephony switch 109 that is connected typically to a number of agent workstations, such as agent workstation 103, each having a telephone 105 and a PC 107 having a video display unit (PC/VDU). There are also typically several to many such agent workstations in such a call center. Switch 109 in this embodiment is enhanced by a computer-telephony integration (CTI) processor 111 connected to the switch by a CTI link 110. Processor 111 and the PC/VDUs at agent workstations are connected on a local area network (LAN) 112. Also connected to the LAN within call center 101 is a file server 113 supporting a client database, and there may be other servers on the LAN as well.

It will be apparent to those with skill in the art that call center 101 may contain a large number of agent stations such as agent satiation 103 as well as multiple file servers, storage units and other equipment without departing from the spirit and scope of the invention. In this embodiment only one unit of each type at a call center is shown, and this minimum arrangement is deemed adequate to fully describe embodiments of the present invention. Similarly, only one home agent workstation is shown, although there may be many such stations in alternative embodiments of the invention.

A client typically contacts call center 101 using client telephone 123. An incoming call from a client is routed through PSTN 125 and into telephony switch 109 via trunk 116 in this embodiment. Telephony switch 109 may be of the form of a Private Branch Exchange (PBX) or Automatic Call Distributor (ACD), or any other type of telephony switch known in the art and suitable for call center utilization.

In a preferred embodiment of the present invention agent station 126 and call center 101 have a dual connection. One of the two connections is a telephone link between the home agent's telephone 131 and telephony switch 109 at the call center. In various embodiments of the invention a plurality of outgoing call ports are reserved for home agent connection. One such line 117 is illustrated in FIG. 1 for the telephone link from switch 109 to home agent station 126, which is completed from the PSTN via line 127 to the home agent's station. The other connection is a data connection between the home agent's PC and data services at the call center. In a preferred embodiment this link is made via a telephony link 129 from home agent station 126 via the PSTN to CTI processor 111 at the call center. Lines 127 and 129 at the home agent station may be in one instance two POTS lines (plain old telephony service), or the B channels of an ISDN connection (2B+D).

In the embodiment shown, CTI processor 111 executes CTI functionality by virtue of a proprietary routine 108 known to the inventors as T-Server. When the call from phone 123 enters PBX 109, a proprietary routine 118 known as a Router is alerted. Router 118 can be a separate unit connected to PBX 109 trough processor 111 as shown in FIG. 1, or may be implemented in other ways. Router 118 selects the best available agent to answer the call. If the Home Agent is selected, then the call is transferred to telephone 133 through trunk 117 and line 127, and associated data is transferred to the home agent's workstation 131 through the data link 119 and 129. Remote agent functionality in conjunction with T-Server is provided at each remote agent station by executing code routines 106 known to the inventor as Home Agent. In this embodiment it is necessary that the T-Server be compatible with Home Agent for the system to function properly. In other embodiments the software applications may execute on different platforms. Given the teaching herein, it will be apparent to those with skill in the art that this is but one example of many implementations that may be made.

There are a variety of ways a data link may be established and maintained for Home Agent functionality. In the embodiment illustrated by FIG. 1, for example, and the data connection is by a dial-up telephony connection to a modem bank 115 at the CTI processor. The modem bank in this embodiment is adapted to serve as many home agents as there are dedicated ports for home agent connection.

There are a number of other ways the data link may be established and maintained. One is by an Internet connection made by the home agent PC through an Internet Service Provider (ISP) dial up, wherein the CTI server is adapted as an Internet-connected server. NT and UNIX dial-ups are other options. The detailed nature of the data connection is not basic to the invention, and many options will be apparent to those with skill in the art.

The way the data connection is made and used relative to calls switched to home agents is important to the invention. In one embodiment the home agent logs in in a manner similar to a login procedure for an agent at a call center. That is, the home agent, at the beginning of a session, dials up the data connection, which initiates a log-in procedure, which after completion connects the home agent's PC/VDU to CTI processor 111, and indirectly to LAN 112 at the call center, and provides for the home agent the CIS service and functions available to all other agents associated with the call center. In this preferred embodiment the data connection, once made, is kept active until the home agent logs off.

In this preferred embodiment, wherein the data connection is kept active, when a call arrives at telephony switch 109 from a client at a telephone represented by telephone 123, and it is determined (for whatever reason) that the call is to go to home agent 126, router 118 directs the switch to transfer the call to home agent station 126. An outgoing call is placed to telephone 133 at the home agent's station, and at the same time data arriving with the call or accessed from database 113 using information derived from the call is transmitted to PC/VDU 131 at the home agent's station via the always-open data connection. In this manner a screen pop with client information and a script for the agent may be displayed on the VDU of PC/VDU 131 at the agent's station by the time the call arrives, or even before the call arrives. When the telephone connection is made the call from the client is switched to telephone 133.

The home agent station has a virtual SoftPhone connection 135 from the telephone to the PC/VDU. This connectivity and functionality is implemented in one embodiment by a TAPI-compliant modem or bridge at the PC/VDU to which voice line 127 interfaces as well as to telephone 133. This connection enables the Home Agent application 106 to have all telephony controls over phone 133. It ensures that the application behaves in same manner whether the agent is located at home, or at the Call Center. It is not strictly required that there be a physical telephone and a physical connection as shown in FIG. 1, however. There are, in alternative embodiments, a number of ways that the SoftPhone connection may be implemented. There are, for example, commercially available applications wherein a telephone may be simulated by software in the PC. There are other implementations as well. What is important is that the SoftPhone is enabled to do outbound dialing for both telephone 133 and data line 129 (modem-connected), and provides other functions as well, such as voice recording, and caller ID.

In an alternative embodiment it is not necessary that the data connection be constantly maintained. In this embodiment, at the call center end of the data connection a full log-in is accomplished when an agent first dials up and logs in from a home agent station, then a simplified log-in is enabled requiring essentially only that the agent station be verified from calling party identification data when a subsequent dial up is made from the agent station during a normal shift time, until the agent formally logs off. In this embodiment, when a call is switched to a home agent, the arriving call at the home agent station from the call center triggers the modified dial up, establishing the dial up data connection more quickly than could be done by a more formal log in. In the minimum log-in embodiment the TAPI interface recognizes an incoming call and automatically dials up the data connection, which, by virtue of the minimum log-in may be established quickly, so data may be provided to the home agent without creating undue delay.

In yet another embodiment unique capability is provided at the call center end of the data link, providing functionality, once an agent has formally logged in, for the call center to dial the agent's PC and establish the data connection. In this case no further log in or verification is needed, and each time a call is switched to the home agent's station, the call center re-establishes the data connection and provides the data for the agent at the agent's PC/VDU. This implementation is nearly as fast as keeping the data link always open, allowing the data and telephone connection to be done as quickly as the voice call is accomplished. In this embodiment circuitry 115 has dialing capability controlled by T-Server 108.

The scope of preprogrammed criteria used to determine whether or not a home agent will be utilized can be unlimitedly broad without departing from the spirit and scope of the present invention. For example, in one embodiment, a home agent may be used only at a certain time of day. In another embodiment, the home agent may be brought in to play after a certain level of incoming calls is detected. In still another embodiment, the home agent may be responsible for answering specific types of requests, and so on.

It will be apparent to one with skill in the art that varying degrees of software integration can be present wherein different commands and functions are utilized without departing from the spirit and scope of the present invention. For example, this instant embodiment describes a control routine used with a typical incoming call to a call center that is predetermined to be transferred to a home agent for disposition. In another embodiment, a different control routine will be used where the incoming call is transferred to a home agent and then linked with a third party (conference calling). Routines for different features available to the call center and subsequently to the home agent such as call forwarding, call waiting, transferring to another call center, and so on will be tailored for each instance. Furthermore, it is intended by the inventor that the present invention supports alternative media types such as Web conferencing, Video Desktop conferencing, and E-mail. With an appropriate ISDN connection and software, all known types of media are supported. It will also be apparent to one with skill in the art that more than one agent can be active and communicating on more than one connected device at the home agents location without departing from the spirit and scope of the present invention. For example, multipoint ISDN configurations are known in the art and allow several users to share the same lines. In another embodiment, Internet connectivity could be maintained by the virtual home agent and the call center whereby an incoming call results from a clickable icon or link embedded in a Web page. In still another embodiment wireless forms of communication may be utilized such as satellite-based communication, and wireless LAN. It is known to the inventor that systems utilizing wireless forms of communication can be linked to a PSTN network and to the Internet to allow for various network schemes and added multimedia capabilities. The present Invention is limited only by the claims that follow.

What is claimed is:

1. A method for establishing a remote agent station from a call center, comprising steps of:

(a) implementing a dial-up data link between a computer platform at the remote agent station and a CTI processor connected to a telephony switch at the call center, wherein enabling the data link includes a log-in procedure, and wherein once established, the connection may be renewed after being broken by a reduced log-in procedure;

(b) receiving incoming calls at the call center;

(c) determining to switch a selected one of the incoming calls to an agent at the remote agent station;

(d) placing a call from the call center to a telephone at the remote agent station via a telephone line connected to the telephone;

(e) detecting the incoming call by a TAPI-compliant device connected to the computer platform at the remote agent station and to the telephone line to the telephone at the remote agent station, initiating thereby a dial up of the data link with the reduced log-in procedure;

(f) switching the selected incoming call to the remote agent station;

(g) retrieving data associated with the selected incoming call from a database at the call center; and (h) forwarding the data associated with the selected incoming call to the computer platform at the remote agent station via the open data link.

2. The method of claim 1 wherein the CTI processor at the call center and the computer platform at the remote agent station each have a modem connected by a telephony line to a telephony network, and in step (e) the data link is established by the computer platform dialing up the CTI processor through the telephony network.

3. The method of claim 2 wherein the telephony network is a publicly-switched telephony network.

4. The method of claim 1 wherein the CTI processor at the call center is adapted as an Internet server, and in step (a) the data link is established by the computer platform at the remote agent station dialing up an Internet service provider and establishing an Internet connection to the CTI processor.

5. The method of claim 1 wherein, in step (h), the data forwarded is displayed as a screen pop on a video display connected to the computer platform at the remote agent station.

6. The method of claim 5 wherein the screen pop includes a script for the agent at the remote agent station.

7. The method of claim 1 wherein first control routines executing at the CTI processor and second control routines executing at the computer platform at the remote agent station are adapted to cooperate over the data link to provide call center services to the agent at the remote agent station.

* * * * *

UNITED STATES PATENT AND TRADEMARK OFFICE
CERTIFICATE OF CORRECTION

| | | |
|---|---|---|
| PATENT NO. | : 7,372,956 B1 | Page 1 of 1 |
| APPLICATION NO. | : 09/387616 | |
| DATED | : May 13, 2008 | |
| INVENTOR(S) | : Dan Kikinis | |

It is certified that error appears in the above-identified patent and that said Letters Patent is hereby corrected as shown below:

On the Title Page:
Replace item (63) with the following:

(63) Division of application No. 08/940,712, filed on Sep. 30, 1997, now Pat. No. 5,960,073, which is a continuation-in-part of application No. 08/840,125, filed on Apr. 3, 1997, now Pat. No. 5,940,495.

In the Specification:
Replace column 1, lines 9-12 with the following:

The present invention is a divisional of application Ser. No. 08/940,712, filed Sep. 30, 1997, now U.S. Pat. No. 5,960,073, which is a continuation-in-part of application Ser. No. 08/840,125, filed Apr. 3, 1997, now U.S. Pat. No. 5,940,495. Application No. 08/840,125 is incorporated herein its entirety by reference.

Signed and Sealed this
Eleventh Day of August, 2015

Michelle K. Lee
*Director of the United States Patent and Trademark Office*